(12) United States Patent
Kato et al.

(10) Patent No.: US 12,590,036 B2
(45) Date of Patent: Mar. 31, 2026

(54) ZIRCONIA PRE-SINTERED BODY SUITABLE FOR DENTAL USE

(71) Applicant: Kuraray Noritake Dental Inc., Kurashiki (JP)

(72) Inventors: Shinichiro Kato, Aichi (JP); Atsushi Matsumoto, Aichi (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 449 days.

(21) Appl. No.: 18/013,921

(22) PCT Filed: Jul. 1, 2021

(86) PCT No.: PCT/JP2021/025036
§ 371 (c)(1),
(2) Date: Dec. 30, 2022

(87) PCT Pub. No.: WO2022/004862
PCT Pub. Date: Jan. 6, 2022

(65) Prior Publication Data
US 2024/0034684 A1 Feb. 1, 2024

(30) Foreign Application Priority Data
Jul. 1, 2020 (JP) ................................. 2020-114377

(51) Int. Cl.
*A61C 13/00* (2006.01)
*A61C 13/08* (2006.01)
(Continued)

(52) U.S. Cl.
CPC ........ *C04B 35/488* (2013.01); *A61C 13/0004* (2013.01); *A61C 13/0022* (2013.01);
(Continued)

(58) Field of Classification Search
None
See application file for complete search history.

(56) References Cited

U.S. PATENT DOCUMENTS 5,560,772 A 10/1996 Huguenin et al.
2013/0221554 A1* 8/2013 Jung .................... A61C 13/083
264/16
(Continued)

FOREIGN PATENT DOCUMENTS

CN 105164084 A 12/2015
CN 111658552 A 9/2020
(Continued)

OTHER PUBLICATIONS

Machine translation via EPO of JP2020109069A, translated Jul. 2, 2025 (Year: 2020).*
(Continued)

*Primary Examiner* — Elizabeth Collister
(74) *Attorney, Agent, or Firm* — Element IP, PLC

(57) ABSTRACT

The present invention provides a zirconia pre-sintered body that exhibits suitable shade, translucency, and strength with short firing. The present invention relates to a zirconia pre-sintered body comprising a multilayer structure including at least three layers containing zirconia and a stabilizer capable of reducing a phase transformation of zirconia, the zirconia comprising predominantly monoclinic crystal system, the multilayer structure including at least two layers that differ from one another in the content of the stabilizer relative to the total mole of the zirconia and the stabilizer, the multilayer structure including at least two layers having substantially the same stabilizer content relative to the total mole of the zirconia and the stabilizer, the zirconia pre-sintered body containing a color component in all of the layers having substantially the same stabilizer content, and
(Continued)

20 the layers having substantially the same stabilizer content differing from one another in the composition of the color component.

18 Claims, 4 Drawing Sheets

(51) Int. Cl.
| | | |
|---|---|---|
| *A61C 13/083* | (2006.01) | |
| *C04B 35/488* | (2006.01) | |
| *C04B 35/64* | (2006.01) | |

(52) U.S. Cl.
CPC .......... *A61C 13/082* (2013.01); *A61C 13/083* (2013.01); *C04B 35/64* (2013.01); *C04B 2235/3239* (2013.01); *C04B 2235/3246* (2013.01); *C04B 2235/3279* (2013.01); *C04B 2235/612* (2013.01); *C04B 2235/6567* (2013.01); *C04B 2235/9661* (2013.01)

(56) References Cited

U.S. PATENT DOCUMENTS

| | | | |
|---|---|---|---|
| 2013/0224454 | A1 | 8/2013 | Jung et al. |
| 2016/0081777 | A1* | 3/2016 | Yamada ............... A61C 13/083 428/220 |
| 2016/0120765 | A1 | 5/2016 | Dang et al. |

| | | | |
|---|---|---|---|
| 2017/0181818 | A1 | 6/2017 | Volkl et al. |
| 2020/0113658 | A1 | 4/2020 | Ban et al. |
| 2020/0283341 | A1 | 9/2020 | Ushio et al. |
| 2020/0317581 | A1 | 10/2020 | Ito |
| 2021/0061715 | A1 | 3/2021 | Kato et al. |
| 2021/0282908 | A1 | 9/2021 | Yamada et al. |
| 2021/0403387 | A1 | 12/2021 | Tsuchiya et al. |
| 2022/0135486 | A1 | 5/2022 | Kudo et al. |

FOREIGN PATENT DOCUMENTS

| | | | |
|---|---|---|---|
| EP | 4218665 | A1 | 8/2023 |
| JP | H07-188578 | A | 7/1995 |
| JP | 2020109069 | A * | 7/2020 |
| WO | WO-2018056330 | A1 | 3/2018 |
| WO | WO-2018155459 | A1 | 8/2018 |
| WO | WO-2019131782 | A1 | 7/2019 |
| WO | WO-2020039924 | A1 | 2/2020 |
| WO | WO-2020179877 | A1 | 9/2020 |

OTHER PUBLICATIONS

International Search Report issued Aug. 24, 2021 in PCT/JP2021/025036 (with English translation), 5 pages.
Written Opinion issued Aug. 24, 2021 in PCT/JP2021/025036 (with English translation), 8 pages.
Extended European Search Report issued Jul. 25, 2024 in corresponding European Patent Application No. 21833528.9, 7 pages.

* cited by examiner

10mm

ZIRCONIA PRE-SINTERED BODY SUITABLE FOR DENTAL USE

TECHNICAL FIELD

The present invention relates to a zirconia pre-sintered body suitable for dental use, and a method of production thereof, and to a method for producing a dental product.

BACKGROUND ART

Zirconia is a compound that undergoes a phase transformation between crystal systems. Partially-stabilized zirconia (PSZ) and fully-stabilized zirconia are solid solutions of zirconia dissolving a stabilizer such as yttria (yttrium oxide; $Y_2O_3$) to reduce such phase transformations, and are used in a wide variety of fields.

In the field of dentistry, zirconia materials are used as materials of frames by taking advantage of their high-strength characteristics. Recent improvements in the translucency of zirconia materials have led to increased production of zirconia-only dental prostheses. Patent Literature 1 discloses a zirconia sintered body with layers having different yttria contents, and the yttria content is decreased from the incisal region toward the cervical region to produce an appropriate level of translucency as a dental prosthesis. Patent Literature 2 discloses a zirconia sintered body containing a pigment and in which the yttria content is different from layer to layer, and the yttria content is decreased from the incisal region toward the cervical region to produce an appropriate level of translucency as a dental prosthesis.

Zirconia-only dental prostheses are often prepared at dental laboratories. However, it has become increasing common to more conveniently prepare zirconia-only dental prostheses at the dental clinic, and this has created an increasing demand for firing zirconia in a short time period. Patent Literature 3 discloses a zirconia pre-sintered body suitable for dental use that exhibits high translucency even after short firing.

CITATION LIST

Patent Literature

Patent Literature 1: US Patent Application Publication Number 2013/0221554
Patent Literature 2: US Patent Application Publication Number 2016/0120765
Patent Literature 3: WO2018/056330

SUMMARY OF INVENTION

Technical Problem

As discussed above, there is an increasing trend to more conveniently prepare zirconia dental prostheses at the dental clinic, and a need exists to develop excellent aesthetic quality while maintaining the strength with zirconia alone. There is also a need for short firing to meet demands such as one-day treatment at the dental clinic.

The zirconia described in Patent Literatures 1 and 2 includes layers with different yttria contents, and appears to have appropriate levels of translucency and strength as a dental prosthesis. A problem, however, is that the firing involves a retention time at the highest firing temperature of 2 hours, and cannot be completed in a short time period. Another issue relating to the need for a diverse lineup of dental prostheses that must be available to accommodate a variety of natural teeth is that the yttria content in the zirconia of Patent Literatures 1 and 2 differs from layer to layer, and cannot accommodate every different translucency, shade, or strength required in dental prostheses.

In the zirconia pre-sintered body described in Patent Literature 3, at least a part of yttria is not dissolved in zirconia as a solid solution, and the zirconia pre-sintered body, even with short firing (for example, firing with a retention time of 30 minutes at the highest firing temperature), can produce a sintered body having translucency comparable to that of a sintered body produced under conventional firing conditions (a retention time of 2 hours at the highest firing temperature). However, the sintered body has the same yttria content throughout from the cervical region to the incisal region, and cannot satisfy the levels of translucency and shade required for the incisal region while providing the strength and shade needed for the cervical region.

There accordingly is a need for a zirconia pre-sintered body that can be fired into a sintered body that has the shade, translucency, and strength suited for dental use (particularly, for use at a dental clinic), even with short firing.

Solution to Problem

The present inventors conducted intensive studies to find a solution to the above problems, and found that the foregoing issues can be solved with a zirconia pre-sintered body that comprises predominantly monoclinic crystal system, and having appropriately adjusted contents of a stabilizer and a color component in each layer. The present invention was completed after further studies based on this finding.

Specifically, the present invention includes the following.

[1] A zirconia pre-sintered body comprising a multilayer structure including at least three layers containing zirconia and a stabilizer capable of reducing a phase transformation of zirconia, the zirconia comprising predominantly monoclinic crystal system, the multilayer structure including at least two layers that differ from one another in the content of the stabilizer relative to the total mole of the zirconia and the stabilizer, the multilayer structure including at least two layers having substantially the same stabilizer content relative to the total mole of the zirconia and the stabilizer, the zirconia pre-sintered body containing a color component in all of the layers having substantially the same stabilizer content, and the layers having substantially the same stabilizer content differing from one another in the composition of the color component.

[2] The zirconia pre-sintered body according to [1], wherein the layers having substantially the same stabilizer content are adjacent to one another.

[3] The zirconia pre-sintered body according to [1] or [2], wherein the color component comprises an oxide of at least one element selected from the group consisting of Ti, V, Cr, Mn, Fe, Co, Ni, Pr, Tb, and Er; or $(Zr,V)O_2$.

[4] The zirconia pre-sintered body according to any one of [1] to [3], wherein the monoclinic crystal system represents 55% or more of the zirconia.

[5] The zirconia pre-sintered body according to any one of [1] to [4], wherein the monoclinic crystal system represents 75% or more of the zirconia.

[6] The zirconia pre-sintered body according to any one of [1] to [5], wherein the layers that differ from one another in the content of the stabilizer differ from one another in the fraction of the monoclinic crystal system.

[7] The zirconia pre-sintered body according to any one of [1] to [6], wherein the multilayer structure includes only one layer having the highest stabilizer content.

[8] The zirconia pre-sintered body according to any one of [1] to [7], wherein the layer having the highest stabilizer content does not contain a color component.

[9] The zirconia pre-sintered body according to any one of [1] to [7], wherein the layer having the highest stabilizer content contains a color component.

[10] The zirconia pre-sintered body according to [9], wherein the color component contained in the layer having the highest stabilizer content differs in composition from the color components of the other layers.

[11] The zirconia pre-sintered body according to any one of [1] to [10], wherein at least a part of the stabilizer is not dissolved in zirconia as a solid solution.

[12] The zirconia pre-sintered body according to any one of [1] to [11], wherein, in the layers that differ from one another in the content of the stabilizer, the stabilizer content relative to the total mole of the zirconia and the stabilizer shows an unchanging pattern of increase or decrease from one end to the other end of the zirconia pre-sintered body on a straight line extending along a first direction from one end to the other end of the zirconia pre-sintered body.

[13] The zirconia pre-sintered body according to any one of [1] to [12], wherein the stabilizer is yttria.

[14] The zirconia pre-sintered body according to [13], wherein, in the layers that differ from one another in the content of yttria, the stabilizer content relative to the total mole of the zirconia and the stabilizer shows an unchanging pattern of increase or decrease from one end to the other end of the zirconia pre-sintered body on a straight line extending along a first direction from one end to the other end of the zirconia pre-sintered body, and wherein the yttria content relative to the total mole of the zirconia and the yttria is 3.5 mol % or more and 6.5 mol % or less in the layer including said one end, and is 2.5 mol % or more and less than 4.5 mol % in the layer including said other end.

[15] The zirconia pre-sintered body according to [14], wherein, in the layers that differ from one another in the content of yttria, the stabilizer content relative to the total mole of the zirconia and the stabilizer shows an unchanging pattern of increase or decrease from one end to the other end of the zirconia pre-sintered body on a straight line extending along a first direction from one end to the other end of the zirconia pre-sintered body, and wherein the difference of yttria content between the layer including said one end and the layer including said other end is 3.0 mol % or less relative to the total mole of the zirconia and the yttria.

[16] The zirconia pre-sintered body according to any one of [13] to [15], wherein the zirconia pre-sintered body shows a peak for yttria in an X-ray diffraction pattern.

[17] The zirconia pre-sintered body according to any one of [13] to [16], wherein the zirconia pre-sintered body has an $f_y$ value of more than 0% as calculated from the following mathematical expression (1),

[Math. 1]

$$f_y(\%) = \frac{I_y(111)}{I_y(111) + I_m(111) + I_m(11-1) + I_t(111) + I_c(111)} \times 100 \quad (1)$$

where $I_y(111)$ represents the peak intensity of the (111) plane of yttria near $2\theta=29°$ in an X-ray diffraction pattern by CuKα radiation, $I_m(111)$ and $I_m(11-1)$ represent the peak intensities of the (111) plane and (11-1) plane, respectively, of the monoclinic crystal system of zirconia in the X-ray diffraction pattern, $I_t(111)$ represents the peak intensity of the (111) plane of the tetragonal crystal system of zirconia in the X-ray diffraction pattern, and $I_c(111)$ represents the peak intensity of the (111) plane of the cubic crystal system of zirconia in the X-ray diffraction pattern.

[18] The zirconia pre-sintered body according to [17], wherein the value of $f_y$ is 13% or less.

[19] The zirconia pre-sintered body according to [17] or [18], wherein, in the layers that differ from one another in the content of yttria, the yttria content relative to the total mole of the zirconia and the yttria shows an unchanging pattern of increase or decrease from one end to the other end of the zirconia pre-sintered body on a straight line extending along a first direction from one end to the other end of the zirconia pre-sintered body, and wherein the layer including said one end has an $f_y$ value of 1% or more.

[20] The zirconia pre-sintered body according to any one of [17] to [19], wherein, in the layers that differ from one another in the content of yttria, the yttria content relative to the total mole of the zirconia and the yttria shows an unchanging pattern of increase or decrease from one end to the other end of the zirconia pre-sintered body on a straight line extending along a first direction from one end to the other end of the zirconia pre-sintered body, and wherein the layer including said other end has an $f_y$ value of 0.5% or more.

[21] The zirconia pre-sintered body according to any one of [1] to [20], wherein the zirconia pre-sintered body has a color difference $\Delta E^*$ of 2.7 or less in all the layers as calculated from the following formula (3) by comparing a shade ($L_1^*$, $a_1^*$, $b_1^*$) of a first sintered body prepared by firing the zirconia pre-sintered body for 15 minutes at an adequate firing temperature, and a shade ($L_2^*$, $a_2^*$, $b_2^*$) of a second sintered body prepared by firing the zirconia pre-sintered body for 120 minutes at the adequate firing temperature, $$\Delta E^* = \{(L_2^*-L_1^*)^2+(a_2^*-a_1^*)^2+(b_2^*-b_1^*)^2\}^{1/2} \quad (3).$$

[22] The zirconia pre-sintered body according to any one of [1] to [21], wherein the zirconia pre-sintered body has a color difference $\Delta E_2^*$ of 0.3 or more and 6.0 or less in the formula (4) below representing the difference between a shade of a first layer and a shade of a second layer of when a shade ($L_3^*$, $a_3^*$, $b_3^*$) of a first layer and a shade ($L_4^*$, $a_4^*$, $b_4^*$) of a second layer are compared for two of the layers having substantially the same stabilizer content in a sintered body prepared by firing the zirconia pre-sintered body for 15 minutes at an adequate firing temperature, $$\Delta E_2^* = \{(L_4^*-L_3^*)^2+(a_4^*-a_3^*)^2+(b_4^*-b_3^*)^2\}^{1/2} \quad (4).$$

where ($L_3^*$, $a_3^*$, $b_3^*$) represents the shade of a first layer in the layers having substantially the same stabilizer content, and $(L_4^*, a_4^*, b_4^*)$ represents the shade of a second layer in the layers having substantially the same stabilizer content.

[23] A method for producing a zirconia pre-sintered body of any one of [1] to [22], comprising pre-sintering at 800° C. to 1,200° C. of a zirconia molded body formed of a raw material powder containing a stabilizer and particles of zirconia that comprises predominantly monoclinic crystal system.

[24] A method for producing a zirconia sintered body, comprising firing a zirconia pre-sintered body of any one of [1] to [22] at a highest firing temperature of 1,400° C. to 1,650° C.

[25] The method according to [24], wherein the method has a retention time of less than 120 minutes at the highest firing temperature.

[26] A method for producing a dental product, comprising sintering a zirconia pre-sintered body of any one of [1] to [22] after milling.

[27] The method according to [26], wherein the milling uses a CAD/CAM system.

Advantageous Effects of Invention

According to the present invention, a zirconia pre-sintered body can be provided that can be fired into a sintered body that has the shade, translucency, and strength suited for dental use (particularly, for use at a dental clinic), even with short firing. Specifically, the present invention can provide a zirconia pre-sintered body that, even with short firing, can be fired into a sintered body having visually recognizable translucency and shade comparable to the translucency and shade of natural teeth, and having a gradation with gradually decreasing levels of translucency. The present invention can also provide a zirconia pre-sintered body that can produce a dental prosthesis having small differences of firing shrinkage rates with no deformation or cracks, even with short firing. In the present specification, "differences of firing shrinkage rates" means differences of shrinkage rates between layers after firing, as will be described in the EXAMPLES section below. As used herein, "short firing" means firing with a retention time of 30 minutes or less at an adequate firing temperature, and the retention time may be 25 minutes or less, 20 minutes or less, or 15 minutes or less.

DESCRIPTION OF EMBODIMENTS

Figure 1:
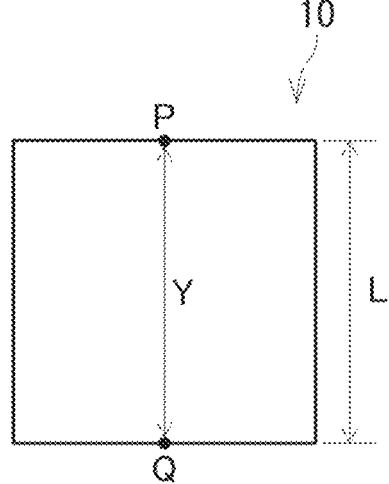
FIG. 1 is a schematic view of a zirconia pre-sintered body

A zirconia pre-sintered body of the present invention comprises a multilayer structure including at least three layers containing zirconia and a stabilizer capable of reducing a phase transformation of zirconia, the zirconia comprising predominantly monoclinic crystal system, the multilayer structure including at least two layers that differ from one another in the content of the stabilizer relative to the total mole of the zirconia and the stabilizer (hereinafter, also referred to simply as "layers having different stabilizer contents"), the multilayer structure including at least two layers having substantially the same stabilizer content relative to the total mole of the zirconia and the stabilizer (hereinafter, also referred to simply as "layers having substantially the same stabilizer content"), the zirconia pre-sintered body containing a color component in all of the layers having substantially the same stabilizer content, and the layers having substantially the same stabilizer content differing from one another in the composition of the color component.

A zirconia pre-sintered body of the present invention is described below. The zirconia pre-sintered body can be a precursor (intermediate product) of a zirconia sintered body. In the present invention, "zirconia pre-sintered body" can refer to, for example, a block formed while zirconia particles (powder) are not fully sintered. The zirconia pre-sintered body has a density of preferably 2.7 g/cm³ or more. The zirconia pre-sintered body has a density of preferably 4.0 g/cm³ or less, more preferably 3.8 g/cm³ or less, even more preferably 3.6 g/cm³ or less. The zirconia pre-sintered body is easily workable when the density falls within these ranges. In the present specification, the upper limits and lower limits of numeric ranges (for example, ranges of contents of components, ranges of values calculated from components, and numeric ranges of physical properties) can be combined appropriately.

A zirconia pre-sintered body of the present invention comprises a multilayer structure including at least three layers, and each layer contains zirconia and a stabilizer capable of reducing a phase transformation of zirconia. The stabilizer is preferably one capable of forming partially-stabilized zirconia. Examples of the stabilizer include oxides such as calcium oxide (CaO), magnesium oxide (MgO), yttria, cerium oxide (CeO₂), scandium oxide (Sc₂O₃), niobium oxide (Nb₂O₅), lanthanum oxide (La₂O₃), erbium oxide (Er₂O₃), praseodymium oxide (Pr₆O₁₁), samarium oxide (Sm₂O₃), europium oxide (Eu₂O₃), and thulium oxide (Tm₂O₃). Preferably, the stabilizer is yttria. The stabilizer content in a zirconia pre-sintered body of the present invention and in a sintered body thereof can be measured using a technique, for example, such as inductively coupled plasma (ICP) emission spectral analysis, or x-ray fluorescence analysis. The stabilizer content in a zirconia pre-sintered body of the present invention and in a sintered body thereof is preferably 0.1 to 18 mol %, more preferably 1 to 15 mol %, even more preferably 1.5 to 10 mol % relative to the total mole of zirconia and stabilizer.

In view of achieving the shade, translucency, and strength suited for dental use (particularly, for use at a dental clinic), and reducing the differences of firing shrinkage rates in short firing, it is required that the zirconia in a zirconia pre-sintered body of the present invention comprise predominantly monoclinic crystal system. The predominant crystal system of zirconia in a zirconia pre-sintered body of the present invention is preferably a monoclinic crystal system also in view of obtaining suitable translucency. In the present invention, "comprising predominantly monoclinic crystal system" means that the fraction $f_m$ of the monoclinic crystal system of zirconia calculated from the mathematical expression (2) below is 50% or more relative to the total amount of all the crystal systems (monoclinic, tetragonal, and cubic) of the zirconia. In a zirconia pre-sintered body of the present invention, the fraction $f_m$ of the monoclinic crystal system in zirconia calculated from the mathematical expression (2) below is preferably 55% or more relative to the total amount of the monoclinic, tetragonal, and cubic crystal systems. In view of providing more suitable shade and superior strength for dental use (particularly, for use at a dental clinic), the fraction $f_m$ of the monoclinic crystal system is more preferably 60% or more, even more preferably 70% or more, yet more preferably 75% or more, particularly preferably 80% or more, still more preferably 85% or more, most preferably 90% or more. Suitable properties can be obtained with these fractions of monoclinic crystal system, including translucency. In view of obtaining suitable properties such as shade, it is preferable that the layers having different stabilizer contents differ from one another in the fraction of the monoclinic crystal system. The fraction $f_m$ of monoclinic crystal system can be calculated from the mathematical expression (2) below, using peaks in an X-ray diffraction (XRD) pattern by CuKα radiation. Supposedly, the predominant crystal system of the zirconia pre-sintered body contributes to elevating the shrinkage temperature and reducing the firing time.

In a zirconia pre-sintered body of the present invention, the peaks for tetragonal and cubic crystal systems may be essentially undetectable. That is, the fraction $f_m$ of the monoclinic crystal system may be 100%.

[Math. 2]

$$f_m(\%) = \frac{I_m(111) + I_m(11-1)}{I_m(111) + I_m(11-1) + I_t(111) + I_c(111)} \times 100 \quad (2)$$

In mathematical expression (2), $I_m(111)$ and $I_m(11-1)$ represent the peak intensities of the (111) plane and (11-1) plane, respectively, of the monoclinic crystal system of zirconia, $I_t(111)$ represents the peak intensity of the (111) plane of the tetragonal crystal system of zirconia, and $I_c(111)$ represents the peak intensity of the (111) plane of the cubic crystal system of zirconia.

In view of achieving the shade, translucency, and strength suited for dental use (particularly, for use at a dental clinic), and reducing the differences of firing shrinkage rates in short firing, it is preferable in a zirconia pre-sintered body of the present invention that the stabilizer be present so that at least a part of the zirconia crystals is monoclinic. In view of achieving the shade, translucency, and strength suited for dental use (particularly, for use at a dental clinic), and reducing the differences of firing shrinkage rates in short firing, it is preferable that at least a part of the stabilizer be not dissolved in zirconia as a solid solution. Whether a part of stabilizer is not dissolved in zirconia as a solid solution can be determined from an XRD pattern, for example. The presence of peaks derived from the stabilizer in an XRD pattern of the zirconia pre-sintered body means the presence of a stabilizer that is not dissolved in zirconia as a solid solution in the zirconia pre-sintered body. A peak derived from the stabilizer is basically not observable in the XRD pattern when the stabilizer is fully dissolved in the solid solution. It is, however, possible, depending on the crystal state or other conditions of the stabilizer, that the stabilizer is not dissolved in zirconia as a solid solution even when the XRD pattern does not show peaks for stabilizers. When the predominant crystal system of zirconia is tetragonal and/or cubic and there is no peak attributed to the stabilizer in the XRD pattern, the stabilizer can be thought of having dissolved in zirconia as a solid solution for the most part, basically completely. In a zirconia pre-sintered body of the present invention, it is not required that the stabilizer be fully dissolved in zirconia as a solid solution. In the present invention, "stabilizer being dissolved as a solid solution" means that, for example, the elements (atoms) contained in the stabilizer are dissolved in zirconia as a solid solution.

In view of achieving the shade and strength suited for dental use (particularly, for use at a dental clinic), it is preferable in a zirconia pre-sintered body of the present invention that the fraction $f_m$ of the monoclinic crystal system in zirconia calculated from the above mathematical expression (2) show an unchanging pattern of increase or decrease in layers having different stabilizer contents, from one end to the other end of the zirconia pre-sintered body on a straight line extending along a first direction from one end to the other end of the zirconia pre-sintered body. In other words, it is preferable that the fraction $f_m$ of the monoclinic crystal system in zirconia monotonously increase or decrease. The fraction $f_m$ of the monoclinic crystal system preferably shows an unchanging pattern of increase or decrease also in view of obtaining suitable translucency. This is described below with reference to FIG. 1 showing a schematic view of a zirconia pre-sintered body. In layers having different stabilizer contents, it is preferable that the pattern of increase or decrease of the fraction $f_m$ of the monoclinic crystal system in zirconia do not change in the opposite direction on a straight line extending along a first direction Y from one end P to the other end Q of the zirconia pre-sintered body 10 shown in FIG. 1. Specifically, when the fraction $f_m$ of the monoclinic crystal system in zirconia is in a pattern of decrease on a straight line from one end P to the other end Q, it is preferable in layers having different stabilizer contents that there exist no interval in which the fraction $f_m$ of the monoclinic crystal system in zirconia essentially increases. In view of achieving the shade and strength suited for dental use (particularly, for use at a dental clinic), it is preferable in certain embodiments that the fraction $f_m$ of the monoclinic crystal system in zirconia, in relation to stabilizer content, be in a pattern of increase on a straight line from one end P to the other end Q when the stabilizer content is in a pattern of decrease on a straight line from one end P to the other end Q. It is also preferable in view of obtaining suitable translucency that the fraction $f_m$ of the monoclinic crystal system in zirconia be in a pattern of increase on a straight line from one end P to the other end Q when the stabilizer content is in a pattern of decrease on a straight line from one end P to the other end Q.

A zirconia pre-sintered body of the present invention contains a color component. The color component is not particularly limited, as long as it imparts a color to a zirconia sintered body. Examples of the color component include a pigment, a complex pigment, and a fluorescent agent.

Examples of the pigment include an oxide of at least one element selected from the group consisting of Ti, V, Cr, Mn, Fe, Co, Ni, Zn, Y, Zr, Sn, Sb, Bi, Ce, Pr, Sm, Eu, Gd, Tb, and Er. Preferably, the pigment comprises an oxide of at least one element selected from the group consisting of Ti, V, Cr, Mn, Fe, Co, Ni, Pr, Tb, and Er.

Examples of the complex pigment include $(Zr,V)O_2$, $Fe(Fe,Cr)_2O_4$, $(Ni,Co,Fe)(Fe,Cr)_2O_4 \cdot ZrSiO_4$ and $(Co,Zn)Al_2O_2$. Preferably, the complex pigment comprises $(Zr,V)O_2$. Examples of the fluorescent agent include $Y_2SiO_5:Ce$, $Y_2SiO_5:Tb$, $(Y,Gd,Eu)BO_3$, $Y_2O_3:Eu$, $YAG:Ce$, $ZnGa_2O_4:Zn$, and $BaMgAl_{10}O_{17}:Eu$.

A zirconia pre-sintered body of the present invention comprises at least two layers that differ from one another in the content of the stabilizer relative to the total mole of zirconia and stabilizer. The number of layers having different stabilizer contents is not particularly limited, as long as it is 2 or more. The number of layers having different stabilizer contents may be 3 or 4, or may be 5 or more. In the present specification, "having different stabilizer contents (for example, yttria contents)" means that the difference in the stabilizer contents of the layers is 0.1 mol % or more. The difference of stabilizer content is preferably 0.3 mol % or more, more preferably 0.5 mol % or more. The difference of stabilizer content is preferably 3.0 mol % or less, more preferably 2.5 mol % or less, even more preferably 2.0 mol % or less, particularly preferably 1.5 mol % or less, most preferably 1.0 mol % or less. A zirconia pre-sintered body of the present invention also comprises at least two layers having substantially the same stabilizer content relative to the total mole of zirconia and stabilizer. The number of layers having substantially the same stabilizer content is not particularly limited, as long as it is 2 or more. The number of layers having substantially the same stabilizer content may be 3 or 4, or may be 5 or more. The layers having substantially the same stabilizer content all contain a color component, and differ from one another in the composition of the color component. By comprising layers having different stabilizer contents and layers having substantially the same stabilizer content, and with the layers having substantially the same stabilizer content all containing a color component and differing from one another in the composition of the color component, a zirconia pre-sintered body of the present invention can reproduce the translucency and the shade change seen in the cervical region of natural teeth, and can achieve a gradual transition of translucency from the cervical to incisal region, reproducing the gradation of translucency, and the translucency and shade of the incisal region, in addition to having an appropriate strength and exhibiting excellent aesthetics. In view of providing superior aesthetics, it is preferable that the layers having substantially the same stabilizer content and differing in the composition of the color component be adjacent to one another.

In the present specification, "having substantially the same stabilizer content (for example, yttria content)" means that the difference of stabilizer content is less than 0.1%. The difference of stabilizer content is preferably less than 0.05%, more preferably less than 0.03%. As used herein, "differing in the composition of a color component" also applies when the layers differ only in the type of color component, or when the layers differ only in the content of color component. By taking as an example two of the layers having substantially the same stabilizer content in a sintered body prepared by firing the zirconia pre-sintered body for 15 minutes at an adequate firing temperature, the type and the content of the color component in each layer can be varied so that the color difference $\Delta E_2^*$ in the shade of a first layer and the shade of a second layer falls within the desired range, as will be described later. The color component may be contained in at least one of the layers of the zirconia pre-sintered body. For example, in the preferred embodiment (X-1) below, only one of a second layer and a third layer may contain a color component. With a zirconia pre-sintered body comprising layers having different stabilizer contents and layers having the same stabilizer content and differing in the amount of color component, it is possible to appropriately set the translucency, shade, and strength required in different portions (layers) of the same material in a zirconia sintered body made from such a zirconia pre-sintered body. The thickness of each layer is not particularly limited, and may be about 0.5 mm to 3 cm.

In a zirconia pre-sintered body of the present invention, there may be some overlap between layers having different stabilizer contents and layers having substantially the same stabilizer content. The following describes specific examples. A certain preferred embodiment (X-1) is, for example, a zirconia pre-sintered body that comprises a multilayer structure of three layers containing zirconia and a stabilizer capable of reducing a phase transformation of zirconia, and in which the zirconia comprises predominantly monoclinic crystal system, and a first layer and a second layer have different stabilizer contents, and the second layer and a third layer have substantially the same stabilizer content. Another preferred embodiment (X-2) is, for example, a zirconia pre-sintered body that comprises a multilayer structure of four layers containing zirconia and a stabilizer capable of reducing a phase transformation of zirconia, and in which the zirconia comprises predominantly monoclinic crystal system, and a first layer, a second layer, and a third layer have different stabilizer contents, and the third layer and a fourth layer have substantially the same stabilizer content. Another preferred embodiment (X-3) is, for example, a zirconia pre-sintered body that comprises a multilayer structure of four layers containing zirconia and a stabilizer capable of reducing a phase transformation of zirconia, and in which the zirconia comprises predominantly monoclinic crystal system, and a first layer and a second layer have different stabilizer contents, and the second layer, a third layer, and a fourth layer have substantially the same stabilizer content. In a zirconia pre-sintered body of the present invention, it is preferable that the layer having the highest stabilizer content be a layer that is present at an end face. For example, the layer having the highest stabilizer content may be a layer including one end P on a straight line extending along a first direction Y from one end P to the other end Q of the zirconia pre-sintered body 10 shown in FIG. 1. In view of obtaining a suitable shade for dental use, a certain preferred embodiment may be, for example, a zirconia pre-sintered body comprising a multilayer structure that includes only one layer having the highest stabilizer content. In a zirconia pre-sintered body of the present invention, the layer having the highest stabilizer content may contain a color component. When the layer having the highest stabilizer content is containing a color component, it is preferable that the composition of the color component contained in this layer differ from the compositions of the color components contained in the other layers. An example of such a zirconia pre-sintered body in which the composition of the color component contained in the layer having the highest stabilizer content differs from the compositions of the color components contained in the other layers is a zirconia pre-sintered body in which the layer having the highest stabilizer content has a different composition of color component as a result of changes made by, for example, reducing the amount of color component or changing the type of color component from the amount or type of the color component contained in layers having substantially the same stabilizer content so that the layer having the highest stabilizer content corresponds to the layer including the incisal region. In another certain embodiment, the stabilizer content in the layer having the highest stabilizer content may be the yttria content of the layer including one end P of the zirconia pre-sintered body 10 described below, when the stabilizer is yttria. In yet another certain embodiment, the stabilizer content in layers having substantially the same stabilizer content may be the yttria content of the layer including the other end Q of the zirconia pre-sintered body 10 described below, when the stabilizer is yttria.

In view of achieving the shade and strength suited for dental use, it is preferable in a zirconia pre-sintered body of the present invention that the stabilizer (preferably, yttria) content relative to the total mole of zirconia and stabilizer, overall, show an unchanging pattern of increase or decrease from one end to the other end of the zirconia pre-sintered body on a straight line extending along a first direction Y from one end P to the other end Q of the zirconia pre-sintered body, even with a plurality of layers having substantially the same stabilizer (preferably, yttria) content. In other words, it is preferable that the stabilizer (preferably, yttria) content monotonously increase or decrease. It is also preferable in view of obtaining suitable translucency that the stabilizer (preferably, yttria) content, overall, show an unchanging pattern of increase or decrease on a straight line extending along a first direction Y from one end P to the other end Q of the zirconia pre-sintered body, even with a plurality of layers having substantially the same stabilizer (preferably, yttria) content. This is described below with reference to FIG. 1 showing a schematic view of a zirconia pre-sintered body. It is preferable that the pattern of increase or decrease of stabilizer content do not change in the opposite direction on a straight line extending along a first direction Y from one end P to the other end Q of the zirconia pre-sintered body 10 shown in FIG. 1. Specifically, when the stabilizer content is in a pattern of decrease on a straight line from one end P to the other end Q, it is preferable that there exist no interval in which the stabilizer content essentially increases, even with a plurality of layers having substantially the same stabilizer (preferably, yttria) content.

The stabilizer is preferably yttria in view of the strength and translucency of a zirconia sintered body made from a zirconia pre-sintered body of the present invention. The following describes an embodiment in which the stabilizer is yttria. The yttria content in the layer including one end P of the zirconia pre-sintered body 10 of FIG. 1 is preferably 3.5 mol % or more, more preferably 3.7 mol % or more, even more preferably 3.8 mol % or more, particularly preferably 4.0 mol % or more, and is preferably 6.5 mol % or less, more preferably 6.0 mol % or less, even more preferably 5.8 mol % or less, particularly preferably 5.5 mol % or less, relative to the total mole of zirconia and yttria. With the layer having a yttria content of 3.5 mol % or more and 6.5 mol % or less, the zirconia sintered body can have an increased translucency, appropriate for the incisal region of a dental prosthesis. The yttria content of the layer including the other end Q of the zirconia pre-sintered body 10 is preferably 2.5 mol % or more, more preferably 3.0 mol % or more, even more preferably 3.3 mol % or more, particularly preferably 3.5 mol % or more, and is preferably less than 4.5 mol %, more preferably 4.2 mol % or less, even more preferably 4.1 mol % or less, particularly preferably 4.0 mol % or less, relative to the total mole of zirconia and yttria. With the layer having a yttria content of 2.5 mol % or more and less than 4.5 mol %, the zirconia sintered body can have an increased strength, appropriate for the cervical region of a dental prosthesis. With a yttria content of 2.5 mol % or more and less than 4.5 mol %, the translucency does not overly increase, and the zirconia sintered body can show a translucency appropriate for the cervical region of a dental prosthesis. Between the layer including one end P and the layer including the other end Q, a zirconia pre-sintered body of the present invention comprises at least one layer as an intermediate layer having a different yttria content from the yttria content of either of the layer including one end P and the layer including the other end Q. In this way, the translucency gradually makes a transition from the cervical region to the incisal region, and the zirconia pre-sintered body can show a translucency comparable to that of natural teeth. In a zirconia pre-sintered body of the present invention, it is more preferable in layers having different yttria contents that the yttria content relative to the total mole of zirconia and yttria show an unchanging pattern of increase or decrease from one end to the other end of the zirconia pre-sintered body on a straight line extending along a first direction from one end to the other end of the zirconia pre-sintered body, and that the yttria content of each layer fall within predetermined ranges.

It is even more preferable in the zirconia pre-sintered body 10 that the yttria content relative to the total mole of zirconia and yttria have a difference of preferably 3.0 mol % or less, more preferably 2.5 mol % or less, even more preferably 2.0 mol % or less between the layer including one end P of the zirconia pre-sintered body 10 and the layer including the other end Q of the zirconia pre-sintered body 10. The difference of yttria content is preferably 0.3 mol % or more, more preferably 0.5 mol % or more, even more preferably 1.0 mol % or more. With a yttria content difference of 3.0 mol % or less between the layer including one end P of the zirconia pre-sintered body 10 and the layer including the other end Q of the zirconia pre-sintered body 10, a dental prosthesis made from the zirconia pre-sintered body 10 does not show an overly large translucency difference between the incisal region and the cervical region, and can exhibit a translucency appropriate as a dental prosthesis. With a yttria content difference of 3.0 mol % or less, the difference between the firing shrinkage rate of the layer including one end P and the firing shrinkage rate of the layer including the other end Q can be confined within 0.3%, and cracking and deformation can be prevented in making a dental prosthesis from zirconia pre-sintered body 10. In certain embodiments of a zirconia pre-sintered body of the present invention, at least one layer having a different yttria content from the yttria content of either of the layer including one end P and the layer including the other end Q is provided as an intermediate layer between the layer including one end P and the layer including the other end Q. The difference of yttria content between the intermediate layer and the layer having a different yttria content from the intermediate layer (for example, the layer including one end P, or the layer including the other end Q) is preferably 2.0 mol % or less, more preferably 1.5 mol % or less, even more preferably 1.0 mol % or less. The yttria content difference is preferably 0.1 mol % or more, more preferably 0.3 mol % or more, even more preferably 0.5 mol % or more.

In a zirconia pre-sintered body of the present invention, the percentage presence $f_y$ of yttria not dissolved in zirconia as a solid solution (hereinafter, also referred to as "undissolved yttria") can be calculated using the following mathematical expression (1).

[Math. 3]

$$f_y(\%) = \frac{I_y(111)}{I_y(111) + I_m(111) + I_m(11-1) + I_t(111) + I_c(111)} \times 100 \tag{1}$$

In mathematical expression (1), $I_y(111)$ represents the peak intensity of the (111) plane of yttria near $2\theta=29°$ in an XRD pattern by CuKα radiation, $I_m(111)$ and $I_m(11-1)$ represent the peak intensities of the (111) plane and (11-1) plane, respectively, of the monoclinic crystal system of zirconia, $I_t(111)$ represents the peak intensity of the (111) plane of the tetragonal crystal system of zirconia, and $I_c(111)$ represents the peak intensity of the (111) plane of the cubic crystal system of zirconia.

In view of providing the shade and strength more suited for dental use (particularly, for use at a dental clinic) and achieving superior strength by short firing, it is preferable that the percentage presence $f_y$ of undissolved yttria in a zirconia pre-sintered body of the present invention be more than 0%, more preferably 1% or more, even more preferably 2% or more. The percentage presence $f_y$ of undissolved yttria may be, for example, 13% or less. However, the upper limit of percentage presence $f_y$ preferably depends on the yttria content of the zirconia pre-sintered body. The percentage presence $f_y$ may be 13% or less in the layer including one end P of the zirconia pre-sintered body 10 of FIG. 1, that is, a layer having a yttria content of 3.5 mol % or more and 6.5 mol % or less. The percentage presence $f_y$ may be 7% or less in the layer including the other end Q of the zirconia pre-sintered body 10 of FIG. 1, that is, a layer having a yttria content of 2.5 mol % or more and less than 4.5 mol %. The percentage presence $f_y$ is preferably 1% or more, more preferably 2% or more, even more preferably 3% or more in the layer including one end P of the zirconia pre-sintered body 10 of FIG. 1, that is, a layer having a yttria content of 3.5 mol % or more and 6.5 mol % or less. The percentage presence $f_y$ is preferably 0.5% or more, more preferably 1% or more, even more preferably 2% or more in the layer including the other end Q of the zirconia pre-sintered body 10 of FIG. 1, that is, a layer having a yttria content of 2.5 mol % or more and less than 4.5 mol %.

By substituting $I_y(111)$ for other peaks, the mathematical expression (1) can be used to calculate the percentage presence of an undissolved fraction of a stabilizer other than yttria.

In view of achieving the shade, translucency, and strength suited for dental use (particularly, for use at a dental clinic) by short firing, it is preferable in a zirconia pre-sintered body of the present invention that the percentage presence $f_y$ of undissolved yttria in the zirconia pre-sintered body calculated by the above mathematical expression (1) show an unchanging pattern of increase or decrease in layers having different yttria contents, from one end to the other end of the zirconia pre-sintered body on a straight line extending along a first direction from one end to the other end of the zirconia pre-sintered body. In other words, it is preferable that the yttria content monotonously increase or decrease, and the percentage presence $f_y$ of undissolved yttria in the zirconia pre-sintered body monotonously increase or decrease in layers having different yttria contents. This is described below with reference to FIG. 1 showing a schematic view of a zirconia pre-sintered body. It is preferable in layers having different yttria contents that the pattern of increase or decrease of the percentage presence $f_y$ of undissolved yttria in the zirconia pre-sintered body do not change in the opposite direction on a straight line extending along a first direction Y from one end P to the other end Q of the zirconia pre-sintered body 10 shown in FIG. 1. Specifically, when the percentage presence $f_y$ of undissolved yttria in the zirconia pre-sintered body is in a pattern of decrease with the yttria content monotonously increasing or decreasing on a straight line from one end P to the other end Q, it is preferable in layers having different yttria contents that there exist no interval in which the percentage presence $f_y$ of undissolved yttria essentially increases. In view of achieving the shade, translucency, and strength suited for dental use (particularly, for use at a dental clinic) by short firing, it is preferable in certain embodiments that the fraction $f_m$ of the monoclinic crystal system in zirconia, in relation to stabilizer content, be in a pattern of increase on a straight line from one end P to the other end Q when the percentage presence $f_y$ of undissolved yttria in the zirconia pre-sintered body is in a pattern of decrease on a straight line from one end P to the other end Q in layers having different yttria contents.

In connection with the above descriptions based on the schematic view of FIG. 1, it is preferable in the present invention that "one end" refer to a point at the incisal end, and "other end" refer to a point at the root (cervical) end, when, for example, the zirconia pre-sintered body and a sintered body thereof have a shape of a crown. The point may be a point on the end face, or a point on a cross section.

When the zirconia pre-sintered body has a circular disc shape or a hexahedral shape such as a cuboid, it is preferable that "one end" refer to a point on the top face, and "other end" refer to a point on the bottom face (base). The point may be a point on the end face, or a point on a cross section.

In the present invention, "first direction from one end to the other end" means a direction in which the yttria content changes. For example, "first direction" is preferably the direction of lamination of a powder in the production method described below. For example, when the zirconia pre-sintered body has a shape of a crown, "first direction" is preferably a direction connecting the incisal and cervical ends.

A zirconia pre-sintered body of the present invention has a flexural strength of preferably 15 MPa or more, in order to provide the strength that allows mechanical working. For easier mechanical working, a zirconia pre-sintered body of the present invention has a flexural strength of preferably 70 MPa or less, more preferably 60 MPa or less.

The flexural strength can be measured in compliance with ISO 6872:2015. For measurement, a specimen measuring 5 mm×10 mm×50 mm is used under the same conditions except for size. For surface finishing, the specimen surfaces, including the chamfered surface, are finished longitudinally with #600 sandpaper. The specimen is disposed in such an orientation that its widest face is perpendicular to the vertical direction (loading direction). In the flexure test, measurements are made at a span length of 30 mm with a crosshead speed of 0.5 mm/min.

A zirconia pre-sintered body of the present invention may comprise additives other than the zirconia, stabilizer, and color component, provided that the present invention can exhibit its effects. The layer having the highest stabilizer content may or may not contain a color component. Examples of the additives include alumina ($Al_2O_3$), titanium oxide ($TiO_2$), and silica ($SiO_2$).

A zirconia pre-sintered body of the present invention can be made by a process in which a zirconia molded body formed of a raw material powder containing zirconia particles, a stabilizer, and a color component is fired (or pre-sintered) at a temperature that does not sinter the zirconia particles (pre-sintering step). The layer having the highest stabilizer content may or may not contain a color component. The zirconia molded body is not particularly limited, and can be produced by a known method (for example, press forming), using a raw material powder containing zirconia particles and a stabilizer. The zirconia particles contained in the raw material powder may be particles (powder) of zirconia that comprises predominantly monoclinic crystal system. The particles of zirconia that comprises predominantly monoclinic crystal system may be a commercially available product. The method of production of the raw material powder is not particularly limited. For example, the method described in WO2018/056330 may be used. Specifically, zirconium oxide of a monoclinic crystal system is mixed with yttria to prepare a mixture. Here, yttria and zirconium oxide of a monoclinic crystal system are separately prepared in independent steps. The mixture is then added into water to prepare a slurry, and the slurry is mixed and pulverized to a predetermined average particle diameter (for example, an average particle diameter of 0.13 μm) by wet pulverization with a ball mill (primary pulverization step). A powder resulting from drying of the pulverized slurry with a spray dryer is fired at 950° C. for 2 hours (firing step). After firing, the powder is added into water to prepare a slurry, and the slurry is pulverized to a predetermined average particle diameter (for example, an average particle diameter of 0.13 μm) or smaller by wet pulverization with a ball mill (secondary pulverization step). After adding a binder to the pulverized slurry, the slurry can be dried with a spray dryer to prepare the raw material powder as a composition. In order to ensure block formation, the firing temperature (pre-sintering temperature) in the pre-sintering step is, for example, preferably 800° C. or more, more preferably 900° C. or more, even more preferably 950° C. or more. For increased dimensional accuracy, the firing temperature is, for example, preferably 1,200° C. or less, more preferably 1,150° C. or less, even more preferably 1,100° C. or less. That is, the firing temperature in a method of production of a zirconia pre-sintered body of the present invention is preferably 800° C. to 1,200° C. Conceivably, dissolution of the stabilizer in the solid solution does not proceed in the pre-sintering step with the firing temperature confined in this range.

A zirconia pre-sintered body of the present invention may be a molded body having a predetermined shape. For example, the zirconia pre-sintered body may have a shape of a disc (circular disc), a cuboid, or a dental product (for example, a shape of a crown). The pre-sintered body also encompasses dental products (for example, a crown-shaped dental prosthesis) obtained after working of a pre-sintered zirconia disc with a CAD/CAM (Computer-Aided Design/Computer-Aided Manufacturing) system.

Concerning shades, a zirconia pre-sintered body of the present invention can be made into a sintered body having a suitable shade, even with short firing. Assume here that a sintered body prepared by firing a zirconia pre-sintered body of the present invention at an adequate firing temperature for a certain time period is a first sintered body, and a sintered body prepared by firing a zirconia pre-sintered body of the present invention at an adequate firing temperature for 120 minutes is a second sintered body. When the firing time for the first sintered body is 15 minutes, and the shade of the first sintered body ($L_1^*$, $a_1^*$, $b_1^*$) is compared with the shade of the second sintered body ($L_2^*$, $a_2^*$, $b_2^*$), it is preferable that the color difference $\Delta E^*$ represented by the following formula (3) be preferably 2.7 or less, more preferably 2.0 or less, even more preferably 1.6 or less, particularly preferably 0.8 or less for all layers.

$$\Delta E^* = \{(L_2^*-L_1^*)^2+(a_2^*-a_1^*)^2+(b_2^*-b_1^*)^2\}^{1/2} \qquad (3)$$

The adequate firing temperature, shade, and shade difference in the present invention will be described in detail through the methods of evaluations in the EXAMPLES section below, along with other information.

In a zirconia pre-sintered body of the present invention, the multilayer structure includes at least two layers having substantially the same stabilizer content, as described above. In other words, the multilayer structure includes at least a first and a second layer having substantially the same stabilizer content. In certain embodiments, two of the layers having substantially the same stabilizer content in a sintered body prepared by firing the zirconia pre-sintered body at an adequate firing temperature for minutes have a color difference $\Delta E_2^*$ of preferably 0.3 or more, more preferably 0.4 or more, even more preferably 0.5 or more in the formula (4) below when the shade of a first layer ($L_3^*$, $a_3^*$, $b_3^*$) and the shade of a second layer ($L_4^*$, $a_4^*$, $b_4^*$) are compared, in order for the sintered body to reproduce the shade change seen in the cervical region of natural teeth. The color difference $\Delta E_2^*$ is preferably 6.0 or less, more preferably 5.0 or less, even more preferably 4.5 or less, particularly preferably 4.0 or less.

$$\Delta E_2^* = \{(L_4^*-L_3^*)^2+(a_4^*-a_3^*)^2+(b_4^*-b_3^*)^2\}^{1/2} \qquad (4)$$

In the formula, ($L_3^*$, $a_3^*$, $b_3^*$) represents the shade of a first layer in the layers having substantially the same stabilizer content, and ($L_4^*$, $a_4^*$, $b_4^*$) represents the shade of a second layer in the layers having substantially the same stabilizer content.

In another certain embodiment, it is preferable that the color difference $\Delta E_2^*$ between adjacent layers of all the layers having substantially the same stabilizer content fall within the foregoing ranges, in order for the sintered body to reproduce the shade change seen in the cervical region of natural teeth.

A zirconia pre-sintered body of the present invention comprises a multilayer structure including at least two layers having substantially the same stabilizer content relative to the total mole of zirconia and stabilizer, and contains a color component in all of the layers having substantially the same stabilizer content, and the layers having substantially the same stabilizer content differ from one another in the composition of the color component. Additionally, the zirconia contained in each layer comprises predominantly monoclinic crystal system. In this way, the color difference $\Delta E_2^*$ between layers having substantially the same stabilizer content in a zirconia sintered body can be confined within the foregoing ranges with short firing, despite the presence of layers having substantially the same stabilizer content. Taken as a whole, the zirconia sintered body obtained has translucency and shades similar to the translucency and shades of natural teeth, and can show a gradation with gradually decreasing translucency due in part to the sintered body having the color difference needed to reproduce the shade change seen in the cervical region of natural teeth, in addition to having at least two layers having different stabilizer contents. Related art cannot produce such effects because, in related art such as Patent Literatures 1 and 2, the layers in a block or a blank all have different yttria contents, and these related art documents do not suggest or use a block or a blank in which the predominant crystal system of zirconia contained in each layer is monoclinic. Moreover, for example, as shown in Examples (paragraph [0123]) of Patent Literature 1, Patent Literature 1 fails to suggest the zirconia in each layer comprises predominantly monoclinic crystal system, which is distinctive from commercially available zirconia containing monoclinic crystal system, was not used and the above mentioned technical effects were not obtained.

The following describes a zirconia sintered body of the present invention. In the present invention, a zirconia sintered body can be said as, for example, a body of zirconia particles (powder) that has been sintered. Particularly, a zirconia sintered body of the present invention refers to a zirconia sintered body made from a zirconia pre-sintered body of the present invention. The zirconia sintered body has a relative density of preferably 99.5% or more. The relative density can be calculated as a ratio of the actual density, measured by the Archimedes method, with respect to the theoretical density.

A zirconia sintered body of the present invention encompasses not only sintered bodies after sintering of a molded zirconia particles under ordinary pressure or no applied pressure, but sintered bodies compacted by a high-temperature pressing process such as HIP (Hot Isostatic Pressing).

A zirconia sintered body of the present invention has the same zirconia and stabilizer contents as the pre-sintered body to be made into a sintered body. Concerning the crystal systems of zirconia in the zirconia sintered body, the fraction $f_m$ of monoclinic crystal system is preferably 10% or less, more preferably 5% or less. Even more preferably, the monoclinic crystal system is essentially absent (0%). The tetragonal and/or cubic crystal systems represent crystal systems other than the monoclinic crystal system.

Concerning the fraction of the stabilizer dissolved in a zirconia sintered body of the present invention, it is preferable that 95% or more of the stabilizer contained be dissolved in zirconia as a solid solution. More preferably, essentially all the stabilizer is dissolved in zirconia as a solid solution. That is, the percentage presence $f_y$ of undissolved yttria is preferably 5% or less, more preferably 1% or less. Even more preferably, essentially all the yttria is dissolved in the solid solution (the percentage presence $f_y$ of undissolved yttria is 0%). Dissolution of the stabilizer (for example, yttria) in zirconia as a solid solution probably takes place in the sintering step described below.

The following describes a method of production of a zirconia sintered body of the present invention. A zirconia sintered body of the present invention can be made by firing a zirconia pre-sintered body at a temperature that sinters the zirconia particles (sintering step). The firing temperature in the sintering step is, for example, preferably 1,400° C. or more, more preferably 1,450° C. or more. The firing temperature is, for example, preferably 1,650° C. or less, more preferably 1,600° C. or less. The rate of temperature increase and the rate of temperature decrease are preferably 300° C./min or less. That is, it is preferable in a method of production of a zirconia sintered body of the present invention that the zirconia pre-sintered body be fired at a highest firing temperature of 1,400° C. to 1,650° C. The highest firing temperature may be the adequate firing temperature of the zirconia pre-sintered body.

In the sintering step, the retention time at the sinterable temperature (for example, highest firing temperature) is preferably less than 120 minutes, more preferably 90 minutes or less, even more preferably 75 minutes or less, yet more preferably 60 minutes or less, particularly preferably 45 minutes or less, most preferably 30 minutes or less. The retention time may be 25 minutes or less, 20 minutes or less, or 15 minutes or less. The retention time is preferably 1 minute or more, more preferably 5 minutes or more, even more preferably 10 minutes or more. A zirconia pre-sintered body of the present invention, even with such a short firing time, can reduce a shade change in the zirconia sintered body produced. With a short firing time, it is also possible to increase production efficiency, and reduce the energy cost.

Preferably, the rate of temperature increase and the rate of temperature decrease in the sintering step are set so as to reduce the time required for the sintering step. For example, the rate of temperature increase can be set so as to bring the firing temperature to the highest firing temperature in as short a time period as possible, depending on the performance of the furnace. The rate of temperature increase to the highest firing temperature may be, for example, 10° C./min or more, 50° C./min or more, 100° C./min or more, 120° C./min or more, 150° C./min or more, or 200° C./min or more. Preferably, the rate of temperature decrease is set to a rate that does not cause cracks or other defects in the sintered body. For example, the sintered body may be allowed to cool at room temperature after being heated. Here, the highest firing temperature means the highest temperature reached in the sintering step.

A zirconia sintered body after firing of a zirconia pre-sintered body of the present invention can be suitably used as a dental product. Examples of dental products include copings, frameworks, crowns, crown bridges, abutments, implants, implant screws, implant fixtures, implant bridges, implant bars, brackets, denture bases, inlays, onlays, orthodontic wires, and laminate veneers. The method of producing these dental products can be appropriately selected depending on use. For example, a dental product can be obtained by sintering a zirconia pre-sintered body of the present invention after milling. Preferably, a CAD/CAM system is used for milling.

The present invention encompasses embodiments combining the foregoing features, provided that the present invention can exhibit its effects with such combinations made in various forms within the technical idea of the present invention.

EXAMPLES

The following describes the present invention in greater detail by way of Examples. It should be noted, however, that the present invention is in no way limited by the following Examples, and various changes may be made by a person with ordinary skill in the art within the technical idea of the present invention.
Preparation of Zirconia Pre-Sintered Body Zirconia pre-sintered bodies of Examples and Comparative Examples were prepared using the following procedures.

The raw material powders used to prepare zirconia pre-sintered bodies of Examples 1 to 3 and Comparative Examples 1 and 2 were prepared as follows. First, a zirconia powder of a monoclinic crystal system and a yttria powder were used to prepare a mixture in the compositions shown in Table 1. The mixture was added to water to prepare a slurry, and the slurry was mixed and pulverized to an average particle diameter of 0.13 μm or less by wet pulverization with a ball mill. After pulverization, the slurry was dried with a spray dryer, and the resulting powder was fired at 950° C. for 2 hours to prepare a powder (primary powder). The average particle diameter can be determined by a laser diffraction scattering method. As a specific example of a laser diffraction scattering method, a 0.2% aqueous solution of sodium hexametaphosphate may be used as a dispersion medium for the measurement of average particle diameter, using a laser diffraction particle size distribution analyzer (SALD-2300, manufactured by Shimadzu Corporation).

A color component was added to the primary powder in the compositions shown in Table 1. After adding the color component, the powder was added to water to prepare a slurry, and the slurry was mixed and pulverized to an average particle diameter of 0.13 μm or less by wet pulverization with a ball mill. After adding a binder to the pulverized slurry, the slurry was dried with a spray dryer to prepare a powder (secondary powder). The secondary powder was used as a raw material powder for the production of a zirconia pre-sintered body, as described below.

A zirconia pre-sintered body according to Comparative Example 3 was prepared using a Zpex® Smile (manufactured by Tosoh Corporation) as a raw material powder for layer 1, and a Zpex® (manufactured by Tosoh Corporation) as a raw material powder for layers 2 and 3.

The following describes a method of production of a zirconia pre-sintered body. First, the raw material powders were filled into a 20 mm×25 mm die (inside dimensions) in the order shown in shown in Table 1, and pressed at a surface pressure of 300 kg/cm² for 90 seconds with a uniaxial pressing machine (primary pressing). The molded body after primary pressing was then subjected to CIP molding at 1,700 kg/cm² for 5 minutes to prepare a molded body having a multilayer structure. For each layer, 7.5 g of raw material powder was filled in the four-layer multilayer structure of Example 3, and 10 g of raw material powder was filled in the three-layer multilayer structures of Examples 1 and 2 and Comparative Examples 1 to 3. The molded body was fired at 1,000° C. for 2 hours to prepare a zirconia pre-sintered body.

Figure 2:
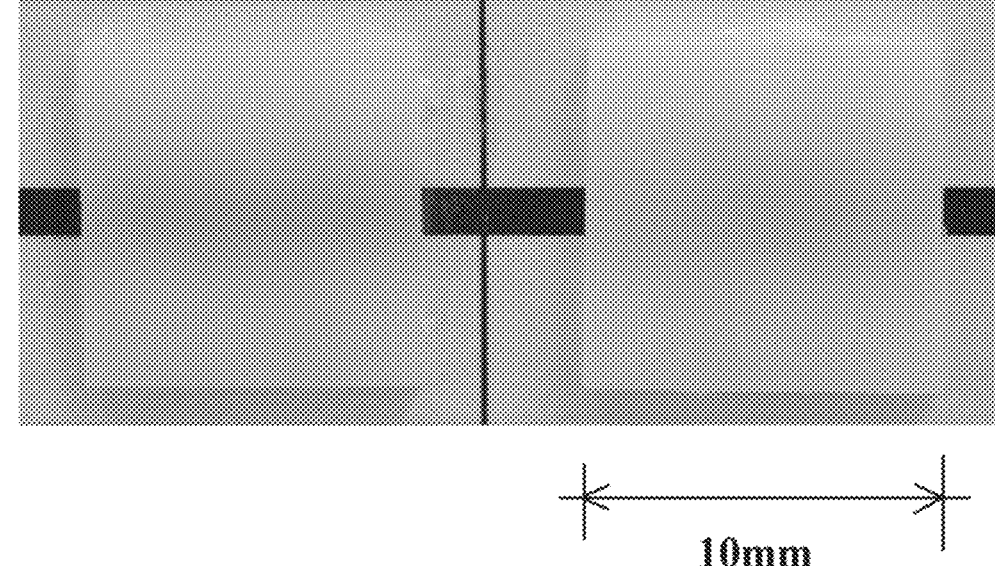
FIG. 2 is a photograph showing the appearance of zirconia sintered bodies in relation to determination of an adequate firing temperature.

Definition and Measurement of Adequate Firing Temperature of Zirconia Pre-Sintered Body In the present invention, the adequate firing temperature of the zirconia pre-sintered body refers to the firing temperature specified by the manufacturer when commercially available zirconia is used. In the absence of specific information of firing temperature, the adequate firing temperature can be specified as follows. First, the zirconia pre-sintered body was fired for 120 minutes at various temperatures, and the both surfaces were polished with #600 abrasive paper to obtain a 0.5 mm-thick specimen of zirconia sintered body. By observing the appearance of the specimen, the adequate firing temperature of each zirconia pre-sintered body was determined from the transparency of the specimen, using the following criteria. The zirconia pre-sintered body can be determined as being sufficiently fired when the transparency is high enough to allow the background to be seen through the zirconia pre-sintered body, as in the specimen on the left-hand side of FIG. 2. On the other hand, firing can be determined as being insufficient when the zirconia pre-sintered body is seen as being low in transparency or being clouded, as in the specimen on the right-hand side of FIG. 2. In the present invention, the lowest temperature at which the zirconia pre-sintered body can be determined as being sufficiently fired as in the specimen on the left-hand side of FIG. 2 was determined as the adequate firing temperature of the zirconia pre-sintered body. In the zirconia pre-sintered body, the adequate firing temperature of zirconia pre-sintered body is the adequate firing temperature in the layer with the highest yttria content.

The adequate firing temperature measured for the zirconia pre-sintered body of each Example and Comparative Example in this fashion was 1,500° C. for Example 1, and 1,550° C. for Examples 2 and 3 and Comparative Examples 1 and 2. The firing temperature specified by the manufacturer for Zpex® and Zpex® Smile (manufactured by Tosoh Corporation) used in Comparative Example 3 is 1,450° C.

Measurement of Difference of Firing Shrinkage Rate

The zirconia pre-sintered body of each Example and Comparative Example was used to prepare a zirconia sintered body by the method below, and the zirconia sintered body was evaluated for the difference of firing shrinkage rate between a layer including one end P and a layer including the other end Q.

Figure 3A:
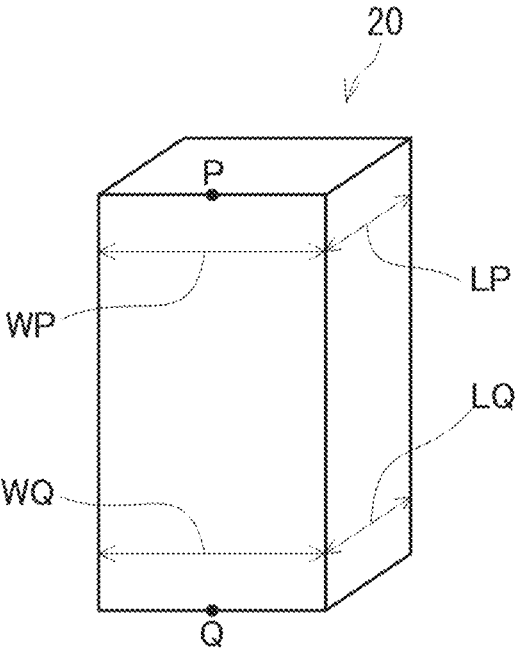
FIG. 3A is a schematic view of a sample for the measurement of firing shrinkage rate.
Figure 3B:
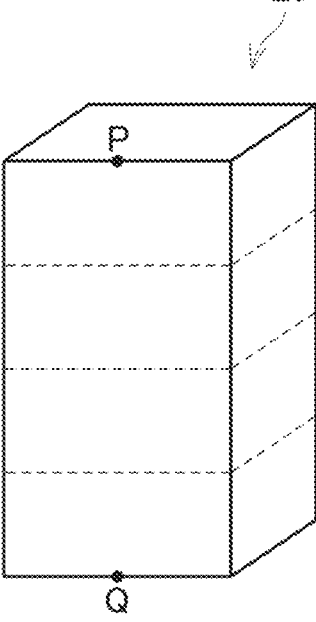
FIG. 3B is a schematic view of a zirconia pre-sintered body.

As shown in FIG. 3A, a zirconia pre-sintered body 20, cuboidal in shape and having a length along the direction of lamination with an 8 mm×10 mm cross section, was cut out from the zirconia pre-sintered body of each Example and Comparative Example prepared by using the method described above. The zirconia pre-sintered body 20 was then measured for the lengths of the longer side WP and shorter side LP of the layer including one end P, and the lengths of the longer side WQ and shorter side LQ of the layer including the other end Q.

Thereafter, the zirconia pre-sintered body 20 was fired at the adequate firing temperature for 120 minutes or 15 minutes to prepare a zirconia sintered body. The rate of temperature increase and the rate of temperature decrease are the same for 120-minute firing and 15-minute firing.

The sintered body was measured for the lengths of the longer side WP and shorter side LP of the layer including one end P, and the lengths of the longer side WQ and shorter side LQ of the layer including the other end Q, and the differences of firing shrinkage rate was calculated using the formula below (n=3). Table 1 shows the evaluation results as the mean values of calculated values. The differences of firing shrinkage rate are given as absolute values.

[Math. 4]

$$(\text{Shrinkage rate of layer including one end } P) =$$

$$\frac{\dfrac{(\text{Length } WP \text{ of sintered body})}{(\text{Length } WP \text{ of Pre-sintered body})} + \dfrac{(\text{Length } LP \text{ of sintered body})}{(\text{Length } LP \text{ of Pre-sintered body})}}{2} \times 100$$

$$(\text{Shrinkage rate of layer including one end } Q) =$$

$$\frac{\dfrac{(\text{Length } WQ \text{ of sintered body})}{(\text{Length } WQ \text{ of Pre-sintered body})} + \dfrac{(\text{Length } LQ \text{ of sintered body})}{(\text{Length } LQ \text{ of Pre-intered body})}}{2} \times 100$$

$$(\text{Difference of firing shrinkage rate}) =$$

$$|(\text{Shrinkage rate of layer including one end } P) - (\text{Shrinkage rate of layer including one end } Q)|$$

Examples 1 to 3 and Comparative Examples 1 to 3

In Examples 1 to 3 and Comparative Examples 1 and 2, the differences of firing shrinkage rate were within 0.3%, as shown in Table 1, demonstrating that the zirconia pre-sintered bodies can be used to prepare dental prostheses with no deformation or cracks. In Examples 1 and 2 and Comparative Examples 1 and 2, the differences of firing shrinkage rate shown in Table 1 are the differences of firing shrinkage rate between layer 1 and layer 3, and the differences of firing shrinkage rate were within 0.3% also between layer 1 and layer 2, and between layer 2 and layer 3. In Example 3, the differences of firing shrinkage rate shown in Table 1 are the differences of firing shrinkage rate between layer 1 and layer 4, and the differences of firing shrinkage rate were within 0.3% also between layer 1 and layer 2, between layer 2 and layer 3, and between layer 3 and layer 4. In Comparative Example 3, the difference of firing shrinkage rate far exceeded 0.3% for 15-minute firing, showing that the zirconia pre-sintered body undergoes large deformation during firing, and is not usable as a dental prosthesis.

TABLE 1

| | | Specifications of zirconia pre-sintered body | | | | | Difference of firing | | | |
| | | | | | Fraction | Percentage | | shrinkage rate | | |
| | | Yttria | Color component | | $f_m$ of monoclinic | presence $f_y$ of undissolved | Adequate firing | Normal firing (120-min | Short firing (15-min | Deforma- |
| | Layer | content | NiO | (Zr, V)O$_2$ | crystal system | yttria | temp. | retention) | retention) | tion |
|---|---|---|---|---|---|---|---|---|---|---|
| Ex. 1 | Layer 1 | 4 mol % | 0 | 0 | 90% | 2.1% | 1500° C. | 0.07% | 0.08% | Excellent |
| | Layer 2 | 3 mol % | 0.003 | 0.006 | 92% | 1.6% | | | | |
| | Layer 3 | 3 mol % | 0.0035 | 0.008 | 91% | 1.8% | | | | |
| Ex. 2 | Layer 1 | 5 mol % | 0.012 | 0.019 | 85% | 3.0% | 1550° C. | 0.09% | 0.12% | Good |
| | Layer 2 | 4 mol % | 0.015 | 0.025 | 91% | 2.0% | | | | |
| | Layer 3 | 4 mol % | 0.02 | 0.032 | 89% | 2.2% | | | | |
| Ex. 3 | Layer 1 | 6 mol % | 0 | 0 | 78% | 3.6% | 1550° C. | 0.12% | 0.21% | Good |
| | Layer 2 | 5 mol % | 0.002 | 0.003 | 85% | 3.1% | | | | |
| | Layer 3 | 4 mol % | 0.003 | 0.005 | 91% | 2.1% | | | | |
| | Layer 4 | 4 mol % | 0.005 | 0.009 | 91% | 2.0% | | | | |
| Com. Ex. 1 | Layer 1 | 5 mol % | 0.012 | 0.019 | 85% | 3.0% | 1550° C. | 0.06% | 0.05% | Excellent |
| | Layer 2 | 5 mol % | 0.015 | 0.025 | 86% | 2.9% | | | | |
| | Layer 3 | 5 mol % | 0.02 | 0.032 | 84% | 2.9% | | | | |
| Com. Ex. 2 | Layer 1 | 6 mol % | 0.012 | 0.019 | 77% | 3.8% | 1550° C. | 0.16% | 0.17% | Good |
| | Layer 2 | 5 mol % | 0.015 | 0.025 | 86% | 2.9% | | | | |
| | Layer 3 | 4 mol % | 0.02 | 0.032 | 89% | 2.2% | | | | |
| Com. Ex. 3 | Layer 1 | 5.3 mol % | 0 | 0 | 0% | 0.0% | 1450° C. | 0.47% | 0.68% | Poor |
| | Layer 2 | 3 mol % | 0.003 | 0.006 | 0% | 0.0% | | | | |
| | Layer 3 | 3 mol % | 0.0035 | 0.008 | 0% | 0.0% | | | | |

Aesthetic Evaluation of Zirconia Sintered Body

The zirconia pre-sintered body of each Example and Comparative Example was used to prepare a zirconia sintered body by the method below, and the zirconia sintered body was visually evaluated for aesthetic quality in comparison to the appearance of natural teeth. A commercially available shade guide providing shades similar to the shades of natural teeth can be used for evaluation. A specific example of such a commercially available shade guide is the VITA Classical shade guide manufactured by VITA under this trade name.

The zirconia pre-sintered body 10 of each Example and Comparative Example prepared by using the above method was milled into a crown shape, using a CAD/CAM system (KATANA® CAD/CAM system; Kuraray Noritake Dental Inc.). After milling, the zirconia pre-sintered body was fired at the adequate firing temperature for 120 minutes or 15 minutes to prepare a zirconia sintered body. The rate of temperature increase and the rate of temperature decrease are the same for 120-minute firing and 15-minute firing. The zirconia sintered bodies all had a length of about 8 mm along the direction of lamination. The zirconia sintered bodies were evaluated by visual inspection, using the following criteria (n=1). The results are presented in Table 2.

Evaluation Criteria

Good: Translucency and shade were comparable to natural teeth, and a gradation with gradually decreasing translucency was observed in both 120-minute firing and firing Moderate: Translucency and shade were comparable to natural teeth, and a gradation with gradually decreasing translucency was observed only in 120-minute firing Poor: A gradation with gradually decreasing translucency was not observed in 120-minute firing or 15-minute firing Examples 1 to 3 and Comparative Examples 1 to 3

In Examples 1 to 3, the zirconia sintered bodies all showed a gradation with gradually decreasing translucency and darker shades from a region corresponding to the layer including one end P to a region corresponding to the layer including the other end Q of the zirconia pre-sintered body 10 shown in FIG. 1, and the appearance was comparable to that of natural teeth by reproducing the translucency and the shade change of the cervical region, and the translucency and shade of the incisal region. Concerning the retention time at the adequate firing temperature in firing the zirconia pre-sintered body, the sintered bodies showed translucency and shades that were not greatly different for 120-minute firing and 15-minute firing, demonstrating the ability to produce a dental prosthesis having the adequate translucency and shade even by short firing.

In Comparative Example 1 corresponding to Patent Literature 3, the translucency change was insufficient in both 120-minute firing and 15-minute firing because of the same yttria content through all the layers, and it was not possible to say that the appearance was comparable to natural teeth, though the shade had the tendency to be darker from a region corresponding to the layer including one end P to a region corresponding to the layer including the other end Q of the zirconia pre-sintered body 10 shown in FIG. 1. In Comparative Example 2, it was not possible to produce the translucency and the shade change seen in the cervical region, and the zirconia sintered body could not be said as being comparable to natural teeth in both 120-minute firing and 15-minute firing because of the changing content of yttria and the changing amount of color component, though the sintered body had a gradation with gradually decreasing translucency and darker shades from a region corresponding to the layer including one end P to a region corresponding to the layer including the other end Q of the zirconia pre-sintered body 10 shown in FIG. 1. In Comparative Example 3, the translucency was much lower when the retention time at the adequate firing temperature was 15 minutes than when it was 120 minutes, showing that the sintered body, with short firing, does not develop the translucency seen in natural teeth, and cannot produce a dental prosthesis having a translucency comparable to that of natural teeth.

Shade Evaluation of Zirconia Sintered Body

For the measurement of the shade of each layer in the zirconia sintered body of each Example and Comparative Example, a zirconia sintered body was individually prepared for each layer using the method below, and was measured for (L\*,a\*,b\*) of L\*a\*b\*color system (JIS Z 8781-4:2013 Color Measurements—Part 4: CIE 1976 L\*a\*b\* color space). The difference in the shade of the sintered body after 120-minute firing and 15-minute firing was confirmed by calculating a color difference $\Delta E^*$ from (L\*,a\*,b\*).

First, a molded body was prepared with the raw material powder of each layer of Examples and Comparative Examples by pressing the raw material powder in a size pre-adjusted to obtain a zirconia sintered body that becomes 1.2 mm thick after polishing the both surfaces at #600. The molded body was fired at 1,000° C. for 2 hours to prepare a zirconia pre-sintered body. After setting the adequate firing temperature, the zirconia pre-sintered body was fired for 120 minutes or 15 minutes to prepare a zirconia sintered body. The zirconia sintered body was polished at #600 on both surfaces to obtain a zirconia sintered body having a thickness of 1.2 mm. The shade was then measured against a white background using a spectrophotometer CM-3610A (manufactured by Konica Minolta Inc.) with a D65 illuminant in measurement mode SCI, with a measurement area/illumination area of 8 mm/11 mm in diameter. The color difference $\Delta E^*$ was determined from the shade ($L_2^*$, $a_2^*$, $b_2^*$) of the zirconia sintered body after 120-minute firing and the shade ($L_1^*$, $a_1^*$, $b_1^*$) of the zirconia sintered body after 15-minute firing, using the following formula (n=3). Table 2 shows the mean values of the calculated results.

$$\Delta E^* = \{(L_2^* - L_1^*)^2 + (a_2^* - a_1^*)^2 + (b_2^* - b_1^*)^2\}^{1/2} \qquad (3)$$

For suitability as a dental product, the preferred color difference $\Delta E^*$ is 2.7 or less, more preferably 2.0 or less, even more preferably 1.6 or less, particularly preferably 0.8 or less.

By using the shade ($L_1^*$, $a_1^*$, $b_1^*$) measured for the zirconia sintered body after 15-minute firing, the color difference $\Delta E_2^*$ between layer 2 and layer 3 of Examples 1 and 2 and Comparative Examples 1 to 3, and the color difference $\Delta E_2^*$ between layer 3 and layer 4 of Example 3 were calculated from the following formula (4).

$$\Delta E_2^* = \{(L_4^* - L_3^*)^2 + (a_4^* - a_3^*)^2 + (b_4^* - b_3^*)^2\}^{1/2} \qquad (4)$$

In the formula, ($L_3^*$, $a_3^*$, $b_3^*$) represents the shade of a first layer (layer 2 of Examples 1 and 2 and Comparative Examples 1 to 3, and layer 3 of Example 3) in the layers having substantially the same stabilizer content, and ($L_4^*$, $a_4^*$, $b_4^*$) represents the shade of a second layer (layer 3 of Examples 1 and 2 and Comparative Examples 1 to 3, and layer 4 of Example 3) in the layers having substantially the same stabilizer content.

The value of $\Delta E_2^*$ calculated from the shade values shown in Table 2 was 3.15 for Example 1, 2.85 for Example 2, and 3.70 for Example 3. These results for Examples 1 to 3 reproducing the shade change of the cervical region provided the basis for the visually confirmed result that the zirconia sintered body, even with short firing, produces a shade comparable to that of natural teeth, including the incisal region.

In each layer of the zirconia sintered bodies of Examples 1 to 3 and Comparative Examples 1 and 2, the shade was not greatly different whether the retention time at the adequate firing temperature was 120 minutes or 15 minutes, and the color difference $\Delta E^*$ was 1.6 or less in each case, as shown in Table 2. In Comparative Example 3, the shade was greatly different when the retention time at the adequate firing temperature was 120 minutes and when it was 15 minutes in each layer, and the color difference $\Delta E^*$ was 3 or more.

TABLE 2

| | | | Specifications of zirconia pre-sintered body | | | | | |
|---|---|---|---|---|---|---|---|---|
| | | Yttria | Color component | | Fraction $f_m$ of monoclinic crystal | Percentage presence $f_y$ of undissolved | Adequate firing | |
| | Layer | content | NiO | (Zr, V)O$_2$ | system | yttria | temp. | Aesthetics |
| Ex. 1 | Layer 1 | 4 mol % | 0 | 0 | 90% | 2.1% | 1500° C. | Good |
| | Layer 2 | 3 mol % | 0.003 | 0.006 | 92% | 1.6% | | |
| | Layer 3 | 3 mol % | 0.0035 | 0.008 | 91% | 1.8% | | |
| Ex. 2 | Layer 1 | 5 mol % | 0.012 | 0.019 | 85% | 3.0% | 1550° C. | Good |
| | Layer 2 | 4 mol % | 0.015 | 0.025 | 91% | 2.0% | | |
| | Layer 3 | 4 mol % | 0.02 | 0.032 | 89% | 2.2% | | |
| Ex. 3 | Layer 1 | 6 mol % | 0 | 0 | 78% | 3.6% | 1550° C. | Good |
| | Layer 2 | 5 mol % | 0.002 | 0.003 | 85% | 3.1% | | |
| | Layer 3 | 4 mol % | 0.003 | 0.005 | 91% | 2.1% | | |
| | Layer 4 | 4 mol % | 0.005 | 0.009 | 91% | 2.0% | | |
| Com. Ex. 1 | Layer 1 | 5 mol % | 0.012 | 0.019 | 85% | 3.0% | 1550° C. | Poor |
| | Layer 2 | 5 mol % | 0.015 | 0.025 | 86% | 2.9% | | |
| | Layer 3 | 5 mol % | 0.02 | 0.032 | 84% | 2.9% | | |
| Com. Ex. 2 | Layer 1 | 6 mol % | 0.012 | 0.019 | 77% | 3.8% | 1550° C. | Poor |
| | Layer 2 | 5 mol % | 0.015 | 0.025 | 86% | 2.9% | | |
| | Layer 3 | 4 mol % | 0.02 | 0.032 | 89% | 2.2% | | |
| Com. Ex. 3 | Layer 1 | 5.3 mol % | 0 | 0 | 0% | 0.0% | 1450° C. | Moderate |
| | Layer 2 | 3 mol % | 0.003 | 0.006 | 0% | 0.0% | | |
| | Layer 3 | 3 mol % | 0.0035 | 0.008 | 0% | 0.0% | | |

| | | Normal firing (120-min retention) | | | Short firing (15-min retention) | | | Color difference |
|---|---|---|---|---|---|---|---|---|
| | | L* | a* | b* | L* | a* | b* | $\Delta E^*$ |
| Ex. 1 | | 89.3 | −1.0 | 0.8 | 89.7 | −0.9 | 0.9 | 0.42 |
| | | 89.5 | −0.6 | 5 | 89.3 | −0.7 | 4.8 | 0.30 |

TABLE 2-continued

| | | | | | | | |
|---|---|---|---|---|---|---|---|
| | 88.2 | −0.1 | 8.2 | 87.6 | −0.2 | 7.4 | 1.00 |
| Ex. 2 | 82 | −0.5 | 17 | 82.5 | −0.3 | 16.5 | 0.73 |
| | 83.9 | 0.1 | 18.8 | 84.5 | 0 | 19.5 | 0.93 |
| | 82.5 | 0.8 | 20.5 | 82.8 | 1.1 | 21.5 | 1.09 |
| Ex. 3 | 86.1 | −1.1 | 0.2 | 86.4 | −1.1 | 0.3 | 0.32 |
| | 88 | −0.8 | 3.5 | 87.5 | −0.9 | 3.7 | 0.55 |
| | 88.6 | −0.4 | 6.5 | 88.8 | −0.3 | 7 | 0.55 |
| | 86.3 | −0.1 | 8.9 | 86.1 | 0.1 | 9.5 | 0.66 |
| Com. Ex. 1 | 82 | −0.5 | 17 | 82.5 | −0.3 | 16.5 | 0.73 |
| | 81.3 | −0.1 | 17.9 | 81.5 | −0.2 | 17.8 | 0.24 |
| | 79.3 | 0.8 | 19.8 | 79.6 | 0.3 | 19.1 | 0.91 |
| Com. Ex. 2 | 80.5 | −0.4 | 16.2 | 80.2 | −0.6 | 15.5 | 0.79 |
| | 81.3 | −0.1 | 17.9 | 81.5 | −0.2 | 17.8 | 0.24 |
| | 82.5 | 0.8 | 20.5 | 82.8 | 1.1 | 21.5 | 1.09 |
| Com. Ex. 3 | 87 | −1.2 | −0.1 | 92 | −0.4 | 1.8 | 5.41 |
| | 90.2 | −2 | 6.5 | 92.5 | −1.8 | 8.5 | 3.05 |
| | 89.8 | −2.3 | 8.8 | 92.3 | −1.9 | 10.6 | 3.11 |

Measurement of Flexural Strength of Zirconia Sintered Body

Example 3

The raw material powder for layer 4 of Example 3 was used to prepare a zirconia pre-sintered body by the method of production of pre-sintered body described above, and the zirconia pre-sintered body was fired under the conditions below to obtain a zirconia sintered body. The zirconia sintered body was measured for flexural strength according to ISO6872 using a sample measuring 1.2 mm×4.0 mm×16.0 mm in size, with the distance between supports (span length) set at 12 mm, and the crosshead speed set to 0.5 mm/min. The flexural strength was 1,170 MPa when the retention time at the highest firing temperature was 120 minutes, and 1,120 MPa when the retention time at the highest firing temperature was 15 minutes. The result that the flexural strength was 1,000 MPa or more with the retention times of both 120 minutes and 15 minutes at the highest firing temperature confirmed that the zirconia sintered body had the strength necessary for the cervical region of a dental prosthesis. The aesthetic properties (translucency, shade) in Example 3 were suited for dental prostheses, regardless of whether the retention time at the highest firing temperature was 120 minutes or 15 minutes, as shown in Table 2. That is, the zirconia sintered body was shown to have both aesthetic properties and strength adequate for dental prostheses.

Example 1

The raw material powder for layer 3 of Example 1 was used to obtain a zirconia sintered body in the same manner as in Example 3. The flexural strength of the zirconia sintered body after the measurement conducted in the same fashion as in Example 3 was 1,310 MPa for the retention time of 120 minutes at the highest firing temperature, and 1,298 MPa for the retention time of 15 minutes at the highest firing temperature.

Example 2

The raw material powder for layer 3 of Example 2 was used to obtain a zirconia sintered body in the same manner as in Example 3. The flexural strength of the zirconia sintered body after the measurement conducted in the same fashion as in Example 3 was 1,157 MPa for the retention time of 120 minutes at the highest firing temperature, and 1,139 MPa for the retention time of 15 minutes at the highest firing temperature.

XRD Measurement of Zirconia Pre-Sintered Body

The crystal systems of zirconia, and the extent of undissolved stabilizer in zirconia as a solid solution were determined. The results are presented in Table 2.

Examples 1 to 3 and Comparative Examples 1 to 3

Figure 4:
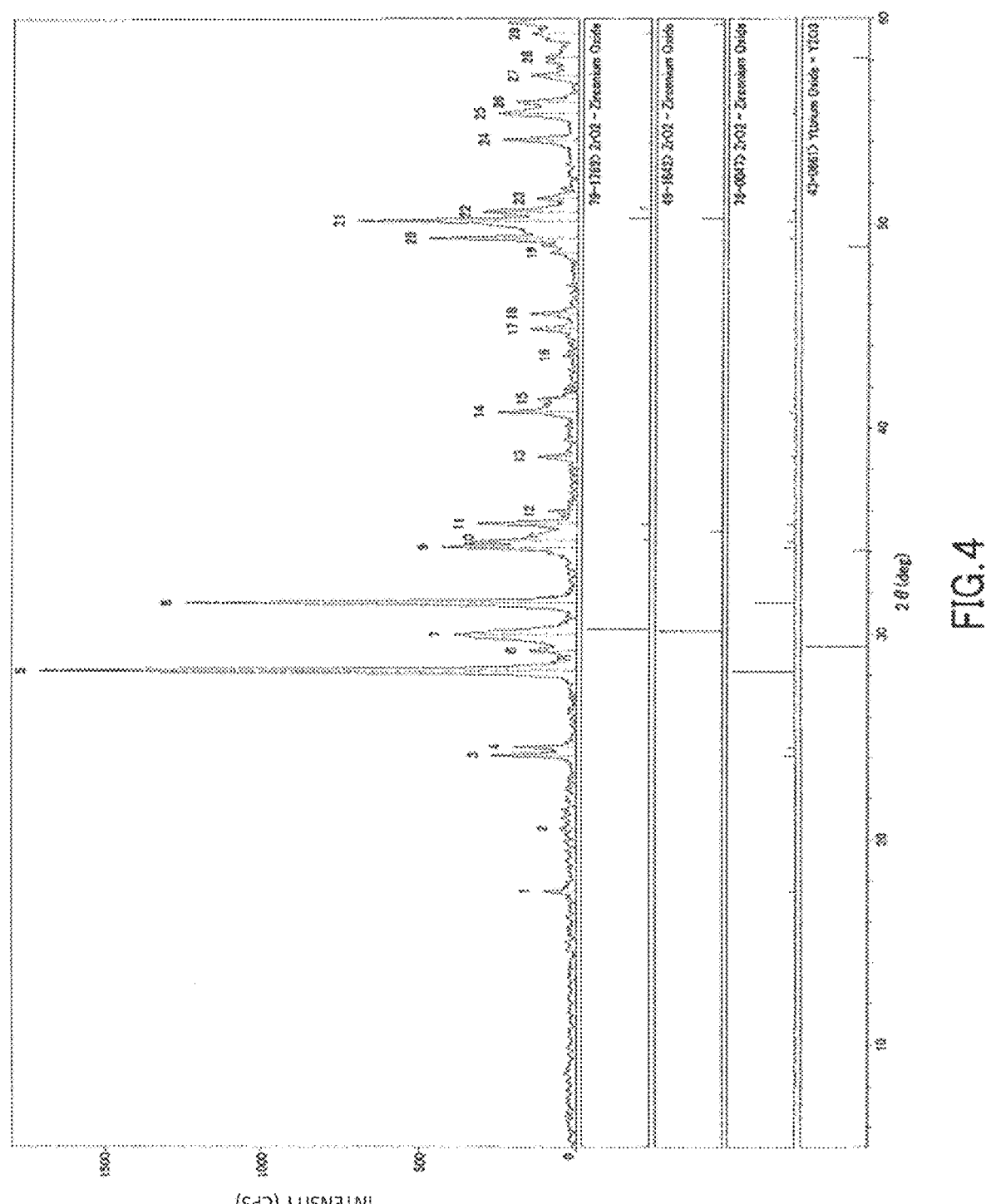
FIG. 4 shows an X-ray diffraction pattern of a pre-sintered body prepared for layer 1 of Example 1.
Figure 5:
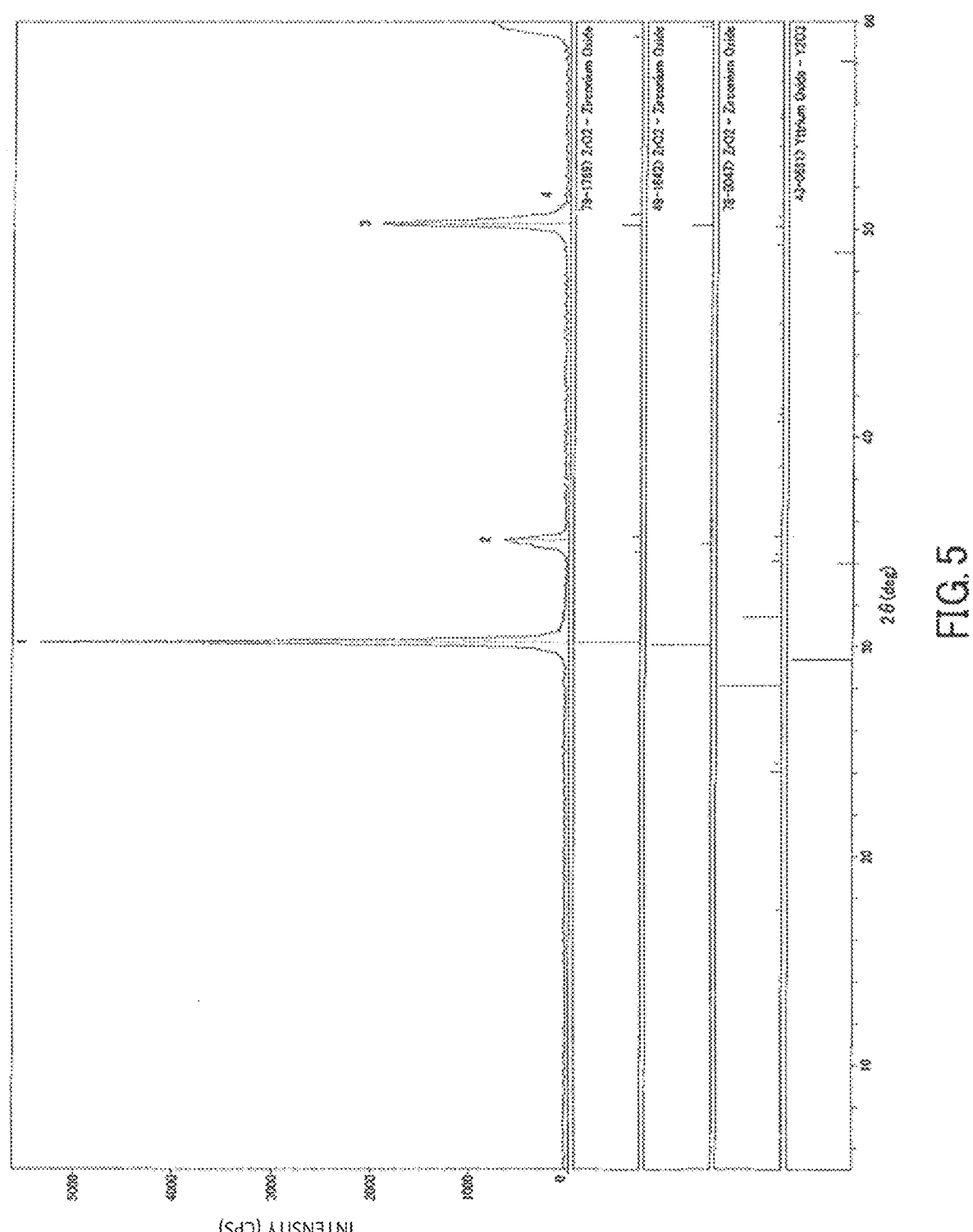
FIG. 5 shows an X-ray diffraction pattern of a pre-sintered body prepared for layer 1 of Comparative Example 3.

An XRD measurement was performed for the zirconia pre-sintered body for each layer of Examples 1 to 3 and Comparative Examples 1 to 3 using CuKα radiation, and $f_y$ and $f_m$ were calculated from the XRD pattern. The results are presented in Tables 1 and 2. FIG. 4 shows an XRD pattern of the zirconia pre-sintered body for layer 1 of Example 1. FIG. 5 shows an XRD pattern of the zirconia pre-sintered body prepared for layer 1 of Comparative Example 3.

As shown in FIG. 5, the zirconia pre-sintered body for layer 1 of Comparative Example 3 did not show a peak for monoclinic zirconia. There was also no peak for yttria. A similar result was observed for layer 2 of Comparative Example 3. As can be seen in FIG. 4, the zirconia pre-sintered body for layer 2 of Example 1 showed peaks for monoclinic, tetragonal, and cubic crystal systems of zirconia, and the peak for monoclinic crystal system had a higher intensity than the peak for tetragonal or cubic crystal system. Similar results were observed in the other Examples. A peak for yttria occurred near $2\theta=29.4°$ in the zirconia pre-sintered bodies of all Examples (peak number 6 in FIG. 4), suggesting that a part of yttria is not dissolved in zirconia as a solid solution in these zirconia pre-sintered bodies.

The numeric ranges given in this specification should be construed such that all numerical values and ranges falling within the ranges specified herein are specifically recited in the specification, even in the absence of specific recitations.

INDUSTRIAL APPLICABILITY

A zirconia pre-sintered body of the present invention and a sintered body thereof can be used for dental products such as prostheses.

REFERENCE SIGNS LIST

10 Zirconia pre-sintered body
P One end
Q Other end
L Entire length
Y First direction

20 Sample for measurement of firing shrinkage rate (zirconia pre-sintered body)

WP Longer side of a layer including one end P

LP Shorter side of a layer including one end P

WQ Longer side of a layer including other end Q

LQ Shorter side of a layer including other end Q

The invention claimed is:

1. A zirconia pre-sintered body, comprising: a multilayer structure including at least three layers containing zirconia and a stabilizer capable of reducing a phase transformation of zirconia, wherein the zirconia comprises predominantly monoclinic crystal system, the multilayer structure comprises at least two layers having different stabilizer contents relative to a total mole of the zirconia and the stabilizer and the difference in the stabilizer contents is 0.1 mol % or more and 3.0 mol % or less, in the layers having different stabilizer contents, the stabilizer content relative to the total mole of the zirconia and the stabilizer shows an unchanging pattern of increase or decrease on a straight line extending along a direction from one end to the other end of the zirconia pre-sintered body, and the stabilizer content relative to the total mole of the zirconia and the stabilizer is 3.5 mol % or more and 6.5 mol % or less in the layer including said one end, and is 2.5 mol % or more and less than 4.5 mol % in the layer including said other end, the multilayer structure comprises at least two layers having substantially the same stabilizer content relative to the total mole of the zirconia and the stabilizer, the zirconia pre-sintered body contains a color component in all of the layers having substantially the same stabilizer content, and the layers having substantially the same stabilizer content have different color component compositions.

2. The zirconia pre-sintered body according to claim 1, wherein the layers having substantially the same stabilizer content are adjacent to one another.

3. The zirconia pre-sintered body according to claim 1, wherein the color component comprises an oxide of at least one element selected from the group consisting of Ti, V, Cr, Mn, Fe, Co, Ni, Pr, Tb, and Er; or $(Zr,V)O_2$.

4. The zirconia pre-sintered body according to claim 1, wherein the monoclinic crystal system represents 55% or more of the zirconia.

5. The zirconia pre-sintered body according to claim 1, wherein the layers having different stabilizer contents have different fractions of the monoclinic crystal system.

6. The zirconia pre-sintered body according to claim 1, wherein the multilayer structure includes only one layer having the highest stabilizer content.

7. The zirconia pre-sintered body according to claim 1, wherein at least a part of the stabilizer is not dissolved in zirconia as a solid solution.

8. The zirconia pre-sintered body according to claim 1, wherein the stabilizer is yttria.

9. The zirconia pre-sintered body according to claim 8, wherein the zirconia pre-sintered body has an $f_y$ value of more than 0% as calculated from the following mathematical expression (1):

$$f_y(\%) = \frac{I_y(111)}{I_y(111) + I_m(111) + I_m(11-1) + I_t(111) + I_c(111)} \times 100 \quad (1)$$

where $I_y(111)$ represents peak intensity of the (111) plane of yttria near $2\theta=29°$ in an X-ray diffraction pattern by CuKα radiation, $I_m(111)$ and $I_m(11-1)$ represent peak intensities of the (111) plane and (11-1) plane, respectively, of the monoclinic crystal system of zirconia in the X-ray diffraction pattern, $I_t(111)$ represents peak intensity of the (111) plane of a tetragonal crystal system of zirconia in the X-ray diffraction pattern, and $I_c(111)$ represents peak intensity of the (111) plane of a cubic crystal system of zirconia in the X-ray diffraction pattern.

10. The zirconia pre-sintered body according to claim 9, wherein the value of $f_y$ is 13% or less.

11. The zirconia pre-sintered body according to claim 1, wherein the zirconia pre-sintered body has a color difference $\Delta E^*$ of 2.7 or less in all the layers as calculated from the following formula (3) by comparing a shade $(L_1^*, a_1^*, b_1^*)$ of a first sintered body prepared by firing the zirconia pre-sintered body for 15 minutes at an adequate firing temperature, and a shade $(L_2^*, a_2^*, b_2^*)$ of a second sintered body prepared by firing the zirconia pre-sintered body for 120 minutes at the adequate firing temperature:

$$\Delta E^* = \{(L_2^* - L_1^*)^2 + (a_2^* - a_1^*)^2 + (b_2^* - b_1^*)^2\}^{1/2} \quad (3).$$

12. The zirconia pre-sintered body according to claim 1, wherein the zirconia pre-sintered body has a color difference $\Delta E_2^*$ of 0.3 or more and 6.0 or less as calculated from the following formula (4) by comparing two of the layers having substantially the same stabilizer content in a sintered body prepared by firing the zirconia pre-sintered body for 15 minutes at an adequate firing temperature:

$$\Delta E_2^* = \{(L_4^* - L_3^*)^2 + (a_4^* - a_3^*)^2 + (b_4^* - b_3^*)^2\}^{1/2} \quad (4),$$

where $(L_3^*, a_3^*, b_3^*)$ represents a shade of a first layer in the two layers, and $(L_4^*, a_4^*, b_4^*)$ represents a shade of a second layer in the two layers.

13. The zirconia pre-sintered body according to claim 1, wherein, in the layers having different stabilizer contents, the difference in the stabilizer contents is 0.3 mol % or more and 3.0 mol % or less.

14. A method for producing the zirconia pre-sintered body of claim 1, the method comprising:

pre-sintering, at 800° C. to 1,200° C., a zirconia molded body formed of a raw material powder containing the stabilizer and particles of the zirconia that comprises predominantly monoclinic crystal system.

15. A method for producing a zirconia sintered body, the method comprising:

firing the zirconia pre-sintered body of claim 1 at a highest firing temperature of 1,400° C. to 1,650° C.

16. The method according to claim 15, wherein the firing is performed for a retention time of less than 120 minutes at the highest firing temperature.

17. A method for producing a dental product, the method comprising:

sintering the zirconia pre-sintered body of claim 1 after milling.

18. The method according to claim 17, wherein the milling uses a CAD/CAM system.

\* \* \* \* \*